Dec. 25, 1962  F. E. BROWN  3,070,105
CONTACT LENS CASE
Filed May 4, 1959
2 Sheets-Sheet 1
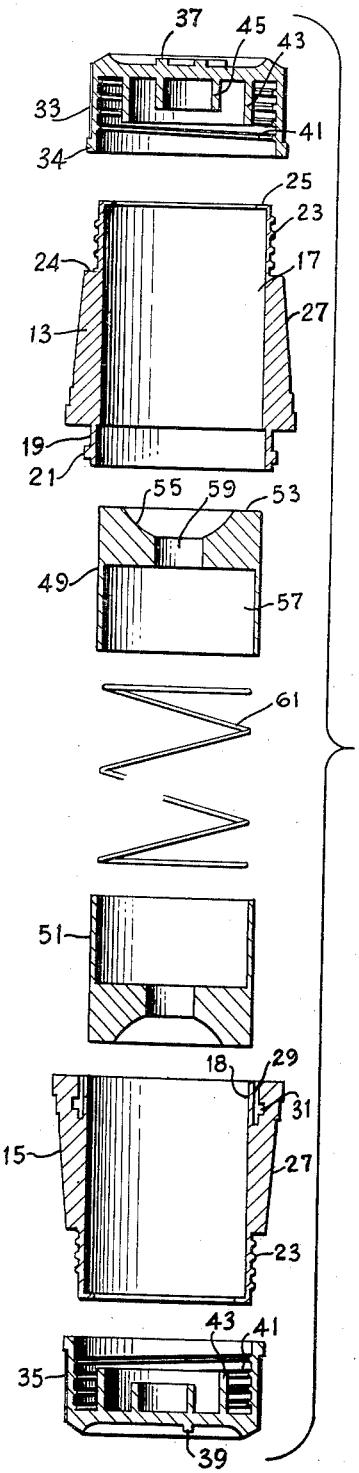
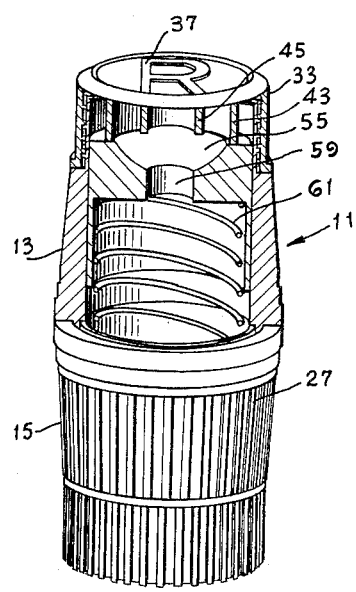
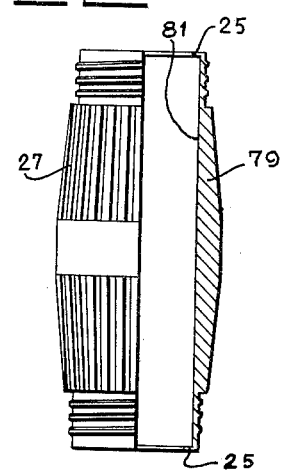
Fig—1
Fig—2
Fig—2A
INVENTOR.
FRANK E. BROWN
BY
A MEMBER OF THE FIRM Dec. 25, 1962
F. E. BROWN
3,070,105
CONTACT LENS CASE
Filed May 4, 1959
2 Sheets-Sheet 2
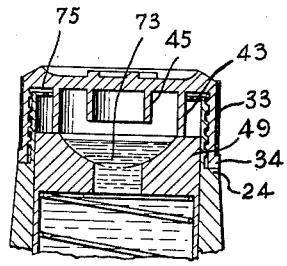
Fig—3
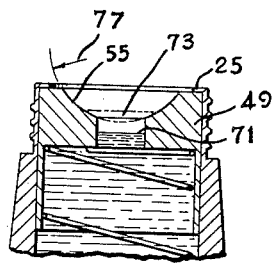
Fig—4
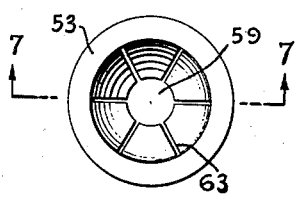
Fig—5
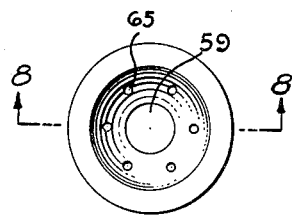
Fig—6
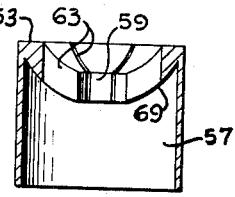
Fig—7
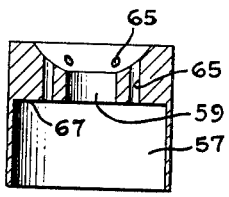
Fig—8
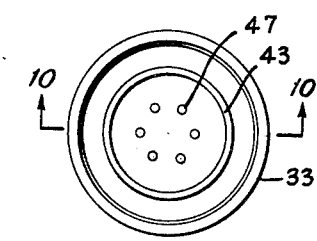
Fig—9
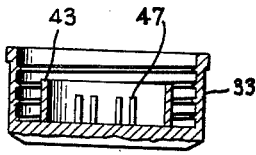
Fig—10
INVENTOR.
FRANK E. BROWN
BY
Robert S. Slim
A MEMBER OF THE FIRM

United States Patent Office 3,070,105
Patented Dec. 25, 1962

3,070,105
CONTACT LENS CASE
Frank E. Brown, Burbank, Calif., assignor, by mesne assignments, to Barnes-Hind International, Inc., Sunnyvale, Calif., a corporation of California
Filed May 4, 1959, Ser. No. 810,708
9 Claims. (Cl. 134—156)

This invention relates to a case and particularly relates to a case for plastic contact lenses.

Contact lenses are becoming increasingly popular and it is important that a case be provided for properly storing the lenses when they are not in use. This invention is based on the relatively recent discovery by Hind and Szekely (Contacto, March 1959, pages 65–68) which shows that methyl-methacrylate lenses absorb a significant amount of water, and that said lenses lose such absorbed water in a remarkably short period of time. In the process of absorbing water (lacrinal fluid) they also absorb the constituents of the tears, which for the most part are inorganic matter, but also have proteinaceous matter. When a lens dries out, it will leave behind the above-mentioned undesirable matter.

Cases to carry lenses or store lenses are an old art. There has never been developed, prior to this time, a case suitable for storing lenses or carrying lenses where the lenses are constantly immersed in an appropriate liquid. This liquid immersion will insure (1) constant hydration of the lenses, and (2) the removal of absorbed foreign material from the tears. Thus, lenses so treated will become more comfortable to the contact lens patient.

This invention also provids a case which will "deliver" the lenses (from the submerged state) to the patient avoiding the common occurrence of scratching or otherwise defacing the optical surfaces.

Since the lenses are quite small, they are somewhat difficult to manipulate and it is important that any storage device present the lens to the user in such a manner that the lens is easy to grasp.

It is therefore an object of the present invention to provide a storage case for contact lenses wherein the lenses are kept in a moist condition.

Another object of this invention is to provide a carrying case for contact lenses wherein the case is made of a softer material than the lenses, obviating the danger of scratching the lenses.

A further object of this invention is to provide a case wherein the lens is presented to the user in such a manner that it is easy to grasp.

Still another object of this invention is to provide a carrying case for contact lenses wherein there is no possibility of the lens sticking into the cap of the case and wherein the lens will remain in the body of the case when the cap is removed.

A further object of this invention is to provide a carrying case for contact lenses wherein the fluid is drawn into the body of the case as the cap is removed.

Another object of this invention is to provide a carrying case for contact lenses wherein liquid will not spill from the case even if the case is tipped on its side with a cap removed.

Another object of this invention is to provide a case for contact lenses wherein the body of the case is made in two pieces which can turn relative to each other whereby the threads of the cap and body are protected.

Other objects and features of advantage will be apparent from the description of the invention which follows.

In the drawings:

FIGURE 1 is a perspective view of an embodiment of the present invention, partly in section.

FIGURE 2 is an exploded sectional view of the device shown in FIGURE 1.

FIGURE 2A is a view, partly in section, of a one-piece body.

FIGURE 3 is a sectional view of one end of the case with the cap in place.

FIGURE 4 is a sectional view, similar to FIGURE 3, showing the position assumed by the parts when the cap is removed.

FIGURE 5 is a plan view of a piston used in the case, showing an alternate structure.

FIGURE 6 is a plan view, showing another alternate structure of a piston.

FIGURE 7 is a section on the lines 7—7 of FIGURE 5.

FIGURE 8 is a section on the lines 8—8 of FIGURE 6.

FIGURE 9 is an interior plan view of an alternate form of cap.

FIGURE 10 is a section on lines 10—10 of FIGURE 9.

Turning now to a description of the carrying case, the case has been generally designated 11. The case has a main body portion which is preferably formed of two segments 13 and 15. The portions 13 and 15 as well as all of the other parts of the case with the exception of a stainless steel spring, to be described, are preferably made of a relatively soft, yieldable plastic. Polyethylene has been found ideal for this purpose, although other soft plastics such as polypropylene, Teflon or nylon could be employed. The body portion 13 has a smooth cylindrical bore 17 throughout substantially its entire length. Extending from the body portion is an annular skirt 19 having a ridge 21 thereon. It will be noted that the inside of the skirt 19 has a slightly larger diameter than the interior bore 17, the purpose of which will be apparent shortly. On the end opposite the skirt 19, the body 13 has a portion of reduced diameter forming the shoulder 24; the reduced diameter portion has threads 23 thereon. At the end of the bore 17, opposite the skirt, there is a small inturned lip 25. Preferably, the central portion of the body has a series of ridges 27 thereon so that the case may be more easily grasped by the user. The mating body portion 15 is identical with the upper body portion 13 with the exception that instead of the skirt 19 and ridge 21, the body portion 15 has a slot 29 adapted to receive the skirt 19 and within this slot 29 there is a second slot 31 adapted to receive the ridge 21. Further, the bore 18 of the portion 15 extends for the entire length of the body portion. It will be understood by those skilled in the art that since the plastic body portions are made of a yielding plastic, that the skirt 19 can be placed in the slot 29 and the two parts forced together. Thereupon, the parts will be held fairly firmly in place, making a liquid-proof seal and can be turned relative to one another although there is is substantial amount of friction and they cannot be easily turned nor can they be easily pulled apart. The bores 17 and 18 form a single continuous cylinder when the two body portions are placed together.

Two caps are provided, one of which is adapted to be screwed on each end of the case. These caps have been designated 33 and 35 and are identical except that suitable indicia may be placed on the ends of the caps to identify the contents. Thus, the cap 33 has a letter "R," designated 37, molded into it to indicate that a right lens is to be carried under it while the opposite cap 35 may have the letter "L," designated 39, molded into it. The caps have a downturned flange terminating in shoulder 34 and the inside of the flange has threads 41 adapted to mate with threads 23. A concentric annular skirt 43 depends into the cap 33, the exact purpose of which will be later explained. To prevent a lens from sticking to the inside surface of the cap, the inside surface has projections therein so that only a relatively small area of the cap can come into contact with a lens. In the embodiment shown in FIGURES 1, 2 and 3, this takes the form of a relatively short annular skirt 45. In the embodiment shown in FIGURES 9 and 10, this takes the form of a series of small pillars 47 which project from the interior surface of the cap.

Mounted within the smooth interior bore made up of the sections 17 and 18 are a pair of pistons 49 and 51 of identical structure. The top of each piston has an annular flat portion 53 and an interior concave portion 55. The bottom of the piston is hollow, forming the tubular portion 57. A hole 59 connects the top concave portion 55 with the bottom tubular section 57. The outer surface of the two pistons forms a substantially airtight and watertight seal with the smooth interior walls 17 and 18, although the pistons are free to slide therein. The two pistons are mounted in opposed relationship as is shown in FIGURE 2 with a stainless steel spring 61 biasing the two pistons to the extreme ends of the case. If the caps 33 or 35 are not in place, the pistons will travel to substantially the extreme ends of the interior bore but will be held slightly within the bore by the lips 25. Thus, the parts will assume the position shown in FIGURE 4. The skirt 43 of the caps 33 and 35 is adapted to clear the lips 25 and to press against the annular flat top portion 53 of the pistons. Thus, when the cap is in place, the cap serves to depress the piston 49 for substantially the length of the skirt so that when a cap is in place, the piston assumes the position shown in FIGURE 3.

Instead of having a single hole 59 at the center of the piston, other forms of opening can be used as is shown in FIGURE 5 through 8. In FIGURE 5, a central opening 59 is employed as before but surrounding this are a series of slots 63 which extend from the central opening to the beginning of the annular ridge 53. In FIGURES 6 and 8, the central opening 59 is employed as before but surrounding this are a number of smaller openings 65. By employing either of these schemes, better circulation of the fluid to the lens in the case is obtained.

Another variation which is possible is in the shaping of the top of the tubular portion 57 of the piston. In the embodiment shown in FIGURE 8, the tubular portion 57 terminates in an upper wall 67 which is flat. However, the wall may have a convex shape as is shown at 69 in FIGURE 7. The convex shape is particularly advantageous when auxiliary openings such as those at 63 or 65 are employed, since it prevents the trapping of air under the piston. Further, this configuration provides a groove which aids in keeping the spring 61 in place.

In normal use, the device would be filled with a liquid, suitably water containing a wetting agent, to about the level 71 shown in FIGURE 4. A lens 73 would then be placed on the concave surface 55. As the cap 33 is put in place and screwed down, as is shown in FIGURE 3, the skirt 43 pressing on the surface 53 causes the piston 49 to be forced down into the liquid, the liquid rising through the opening 59. It will be noted that as the piston is depressed, no pressure is put on the lens and the lens remains free within the cavity. It should also be noted that as the cap is turned down, the seal takes place between the shoulder 24 on the body and the shoulder 34 on the cap and that a slight space is left, as at 75, between the inturned lip 25 and the cap. This is highly desirable, since the lip 25 is quite thin and it is desired not to exert pressure upon it. Of course, as the case is turned upside down for the insertion of the other lens, liquid will flow into the entire space and the lens will be displaced from the position shown in FIGURE 3. However, it will be noted that because of projections such as those as 45 or at 47, there is no flat surface in which the lens can stick to the cap. Thus, as the device is reinverted, the lense will return to approximately the position shown in FIGURE 3.

When it is desired to remove a lens, the cap is unscrewed and the piston 49 will slowly rise as the cap is unscrewed to the position shown in FIGURE 4. From this position, the lens may be easily removed on the tip of a finger placed into the concave portion. It should be particularly noted that if the curve 55 were extended, as at 77, it would completely miss the lip 25 so that there is no tendency of the lens to become caught on the lip 25 as it is removed.

As has been previously stated, the two body portions 13 and 15 are pressed together and can turn relative to each other. This gives a measure of protection to the relatively soft threads 23 and 41 on the body and cap respectively. It is natural to grasp the opposite body portion when screwing a cap into place and if one attempts to screw the cap too tightly, the two halves of the body, 13 and 15, will turn relative to each other before the threads 23 and 41 can be damaged. Although this is a preferred structure, the body may be made in a single piece, as is shown in 2A. Here, the two body portions 13 and 15 are combined in a single piece 79 and the single smooth bore 81 replaces 17 and 18, the parts being otherwise the same. The lips 25 and surrounding structure are sufficiently yielding to permit the insertion of the pistons.

The surface tension of the liquid employed is such that should the device be turned on its side with one of the caps open, the liquid will not spill out because of the relatively small opening 59. This is true regardless of whether the auxiliary openings 63 and 65 are used.

It will be noted that when the piston 49 is down, as is shown in FIGURE 3, the lens is submerged in liquid while when the piston is up, as is shown in FIGURE 4, the liquid is all in the central container and there is no liquid on the lens. The reason for this is that the piston 49 fits very tightly in the walls, so that as it raises from the position shown in FIGURE 3 to that shown in FIGURE 4, suction is exerted on the liquid so that the liquid is sucked into the central opening, and is not held by surface tension in the outer chamber.

Despite the fact that the two parts of the body are merely pressed together, it has been found that there is no leakage of the device even if the device is exposed to sub-atmospheric pressures as would be encountered in a high flying airplane.

I claim:

1. A case for contact lenses or the like comprising a body with a tubular opening therethrough forming a tubular chamber, a pair of opposed pistons each having a concave space in the top thereof, said pistons being mounted in opposed relationship in said tubular chamber with the concave spaces facing opposite directions, means for urging said pistons outwardly from the center of said chamber, means for retaining said pistons within the confines of said chamber and caps adapted to be fastened over each end of said body whereby two separate closed receptacles are provided within said case, and means for retaining a liquid in said case.

2. The structure of claim 1 wherein each of the pistons has a central opening therein.

3. The structure of claim 1 wherein each of the pistons has a hole at the center thereof.

4. The structure of claim 1 wherein each of the pistons has a central hole and has slots extending outwardly from said hole.

5. The structure of claim 1 wherein the body is made of two similar sections joined at the middle which can turn relative to each other.

6. The structure of claim 1 wherein each of the pistons has a relatively large central hole with a plurality of small holes surrounding the central hole.

7. The structure of claim 1 wherein each end of the tubular chamber has an in-turned lip to retain the piston within the chamber.

8. The structure of claim 1 where in each of the caps has a projection thereon adapted to press against and depress a piston as it is placed over the end of the body.

9. The structure of claim 1 wherein the interior surface of the cap has projections thereon adapted to prevent a lens from sticking to the cap.

References Cited in the file of this patent

UNITED STATES PATENTS

| | | |
|---|---|---|
| 140,280 | Keeler | June 24, 1873 |
| 246,379 | Emerson | Aug. 30, 1881 |
| 653,233 | Godward | July 10, 1900 |
| 1,226,733 | Whitney | May 22, 1917 |
| 1,421,093 | Matson | June 27, 1922 |
| 1,466,350 | Barany | Aug. 28, 1923 |
| 1,609,290 | Broderick | Dec. 7, 1926 |
| 1,969,486 | Kurz | Aug. 7, 1934 |
| 2,191,506 | Snyder | Feb. 27, 1940 |
| 2,367,888 | Prideaux | Jan. 23, 1945 |
| 2,877,779 | Bromberg | Mar. 17, 1959 |